(12) United States Patent
Zimmermann

(10) Patent No.: US 7,563,305 B2
(45) Date of Patent: Jul. 21, 2009

(54) FLUID ENCLOSURE AND METHODS RELATED THERETO

(75) Inventor: Joerg Zimmermann, Vancouver (CA)

(73) Assignee: Angstrom Power Incorporated, North Vancouver (CA)

( * ) Notice: Subject to any disclaimer, the term of this patent is extended or adjusted under 35 U.S.C. 154(b) by 413 days.

(21) Appl. No.: 11/473,591

(22) Filed: Jun. 23, 2006

(65) Prior Publication Data

US 2007/0295617 A1 Dec. 27, 2007

(51) Int. Cl.
*F17C 1/00* (2006.01)
*F17C 11/00* (2006.01)

(52) U.S. Cl. .............................. 95/90; 96/154; 206/0.7; 220/592; 220/651; 429/19

(58) Field of Classification Search ...................... 95/90, 95/116; 96/108, 153, 154; 206/0.6, 0.7; 220/581, 586–592, 645, 651–654; 423/248, 423/648.1, 658.2; 429/19
See application file for complete search history.

(56) References Cited

U.S. PATENT DOCUMENTS

| | | | |
|---|---|---|---|
| 3,703,976 A | 11/1972 | Hughes et al. | |
| 4,110,425 A | 8/1978 | Bühl et al. | |
| 4,134,491 A * | 1/1979 | Turillon et al. | 206/0.7 |
| 4,249,654 A * | 2/1981 | Helversen | 206/0.7 |
| 4,583,638 A * | 4/1986 | Bernauer et al. | 206/0.7 |
| 5,360,461 A | 11/1994 | Meinzer | |
| 6,267,299 B1 | 7/2001 | Meyer | |
| 6,638,348 B2 * | 10/2003 | Kuriiwa et al. | 96/146 |
| 7,323,043 B2 * | 1/2008 | Finamore | 96/146 |
| 2003/0209147 A1* | 11/2003 | Myasnikov et al. | 96/146 |
| 2004/0178083 A1* | 9/2004 | Yang et al. | 206/0.7 |
| 2004/0265670 A1* | 12/2004 | Muller et al. | 429/34 |
| 2005/0022883 A1 | 2/2005 | Adams et al. | |
| 2005/0025921 A1* | 2/2005 | Finamore | 428/36.5 |
| 2006/0237688 A1 | 10/2006 | Zimmermann | |

FOREIGN PATENT DOCUMENTS

JP 05-235575 A2 9/2005
WO WO-2007/147260 A1 12/2007

OTHER PUBLICATIONS

"PCT Application No. PCT/CA2007/001129, International Search Report mailed Oct. 19, 2007", 3 pgs.
"PCT Application No. PCT/CA2007/001129, Written Opinion mailed Oct. 19, 2007", 5 pgs.

* cited by examiner

*Primary Examiner*—Frank M Lawrence
(74) *Attorney, Agent, or Firm*—Schwegman, Lundberg & Woessner, P.A.

(57) ABSTRACT

Embodiments of the invention relate to a fluid enclosure including a structural filler and an outer enclosure wall conformably coupled to the structural filler. Embodiments of the present invention further relate to a method of manufacturing a fluid enclosure. The method includes conformably coupling an outer enclosure wall to a structural filler.

82 Claims, 4 Drawing Sheets

FLUID ENCLOSURE AND METHODS RELATED THERETO

TECHNICAL FIELD

Embodiments of the present invention relate to fluid enclosures. More specifically, embodiments relate to fluid enclosures for small or micro scale systems.

BACKGROUND

Currently, fluid enclosures are designed and built independently of the fluid being stored, or of any storage material that would be inserted within the enclosure. In its simplest form, a conventional pressure vessel can be used to contain a fluid, such as a compressed gas or a liquefied gas. The pressure vessel must be designed to accommodate the maximum pressure of the fluid without failure. Such simple design approaches can be extended to incorporate a storage material by filling the pressure vessel with storage material. In this case, the pressure vessel must now withstand the fluid pressure, as well as the stress induced by the force of the storage material exerted on the internal pressure vessel walls. Presently, these vessels tend to be of a cylindrical shape.

When very small storage systems are required, or when irregular (i.e. non-cylindrical) shapes are called for, the overall approach of employing conventional pressure vessels becomes problematic. In order to contain the internal pressures and mechanical stresses induced by a storage material, wall thickness and material properties of the enclosure must be sufficient to prevent rupture. Material properties considered include tensile strength, ductility, material compatibility, enclosure geometry, stress factors, etc. As a result, the range of materials that can be used to construct the enclosure is limited, and only vessel geometries which do not overly amplify the internal pressures as enclosure stress can be considered.

Challenges to fluid enclosure design are amplified when incorporated in small systems, such as in a small or micro scale fuel cell. In small systems, fluid enclosure wall thickness consumes a significant portion of the volume of the enclosure. Prismatic shapes or irregular form factors are very difficult to utilize since they will bow outward under even modest fluid pressure. When absorbing materials (e.g. hydrides) are used, the mechanical strain on the internal tank walls can induce large stresses.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
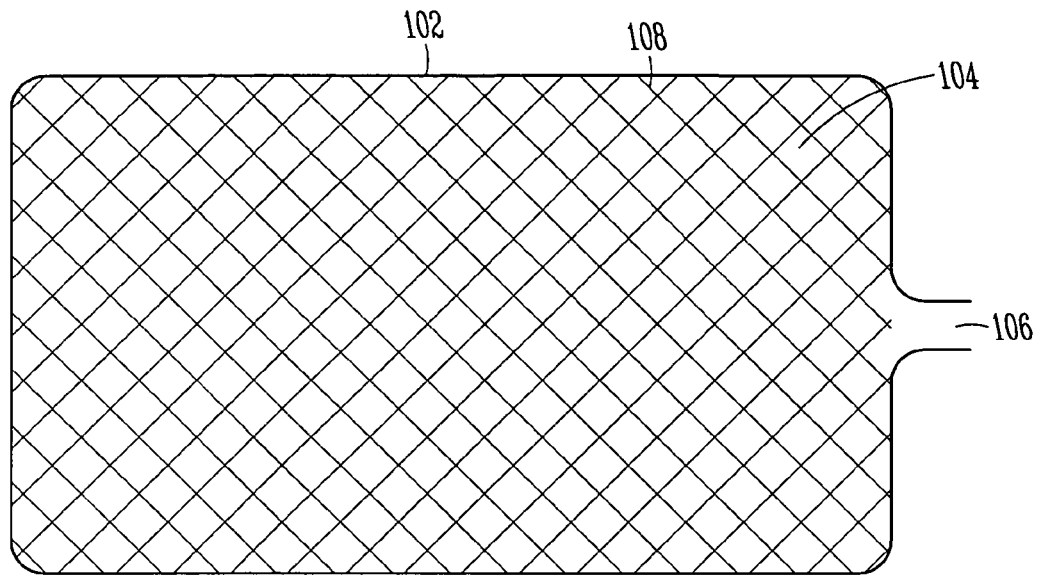
FIG. 1 illustrates a cross-sectional view of a fluid enclosure, according to some embodiments.

Embodiments of the invention relate to a fluid enclosure comprising a structural filler and an outer enclosure wall conformably coupled to the structural filler. Embodiments of the present invention further relate to a method of manufacturing a fluid enclosure. The method includes conformably coupling an outer enclosure wall to a structural filler.

Embodiments of the invention relate to a method of storing a fluid. The method includes contacting a fluid enclosure with a fluid, wherein the fluid enclosure includes a structural filler and an outer enclosure wall conformably coupled to the structural filler. Embodiments further relate to a method of using a fluid enclosure. The method includes releasing a fluid from a fluid enclosure, wherein the fluid enclosure includes a structural filler and an outer enclosure wall conformably coupled to the structural filler.

Embodiments of the invention relate to a fluid enclosure system. The system includes a fluid enclosure and an external device coupled to the fuel enclosure, wherein the fluid enclosure includes a structural filler and an outer enclosure wall conformably coupled to the structural filler.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive or unless otherwise indicated. In addition, it is to be understood that the phraseology or terminology employed herein, and not otherwise defined, is for the purpose of description only and not of limitation. In the event of inconsistent usages between this document and those documents so incorporated by reference, the usage in the incorporated reference should be considered supplementary to that of this document; for irreconcilable inconsistencies, the usage in this document controls.

Embodiments of the present invention relate to a fluid enclosure. The embodiments of the present invention allow for a fluid enclosure in which a structural filler within the enclosure supports the stress applied by the internal fluid pressure rather than having that pressure be fully supported by the enclosure wall as is the case for traditional fluid enclosures. The enclosure may include a structural filler with an outer enclosure wall conformably coupled to it. Since the outer enclosure wall bonds to the structural filler, the fluid pressure applied to the enclosure is fully supported as isostatic tensile stress in the structural filler. The only significant stress that the outer enclosure wall experiences may be due to straining of the structural filler. The burst pressure of the enclosure is therefore limited to the ultimate tensile strength of the structural filler or the bond between the structural filler and the outer enclosure wall. This architecture allows compact, lightweight, and conformable fluid enclosures to be built that can support significant internal pressures without the encumbrance of thick enclosure walls.

Definitions

As used herein, "fluid" refers to a continuous, amorphous substance whose molecules move freely past one another and that has the tendency to assume the shape of its container. A fluid may be a gas, liquefied gas, liquid or liquid under pressure. Examples of fluids include hydrogen, methanol, ethanol, formic acid, butane, borohydride compounds, etc.

As used herein, "structural filler" refers to a material with a sufficient tensile strength to withstand the internal pressure of a fluid enclosure, when pressurized with a fluid. Structural fillers may be solid. Structural fillers may include metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

As used herein, "conformably coupled" refers to forming a bond that is substantially uniform between two components and are attached in such as way as to chemically or physically bind in a corresponding shape or form. A structural filler may be conformably coupled to an outer enclosure wall, for example, in which the outer enclosure wall chemically or physically binds to the structural filler and takes its shape.

As used herein, "outer enclosure wall" refers to the outermost layer within a fluid enclosure that serves to at least partially slow the diffusion of a fluid from the fluid enclosure. The outer enclosure wall may include multiple layers of the same or differing materials. The outer enclosure wall may include a polymer or a metal, for example.

As used herein, "feature" refers to a fluidic component associated with a fluid enclosure. A feature may act to communicate between an enclosure and an external device or ambient environment, to observe or control a fluid, or act as a structural component. Examples of a feature may be a valve, regulator, pressure relief device, flow element, cap, fitting, vent, etc.

As used herein, "structural feature" refers to an element that may be associated with the shape, positioning or alignment of the structural filler, the outer enclosure wall or the overall fluid enclosure. A structural feature may be formed to allow space for external components or to create more efficient alignment between the fluid enclosure and an external device, for example. Structural features include convex protrusions, concave recesses, mountings, flanges, fittings, bosses, smoothed or radiused corners, etc.

As used herein, "metal hydride particles" or "metal hydrides" refer to metal or metal alloy particles that are capable of forming metal hydrides when contacted with hydrogen. Examples of such metal or metal alloys are $LaNi_5$, FeTi, $Mg_2Ni$ and $ZrV_2$. Such compounds are representative examples of the more general description of metal hydride compounds: AB, $AB_2$, $A_2B$, $AB_5$ and BCC, respectively. When bound with hydrogen, these compounds form metal hydride complexes, such as $MgH_2$, $Mg_2NiH_4$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof.

As used herein, "composite hydrogen storage material" refers to active material particles mixed with a binder, wherein the binder immobilizes the active material particles sufficient to maintain relative spatial relationships between the active material particles. Examples of composite hydrogen storage materials are found in commonly-owned U.S. patent application Ser. No. 11/379,970, filed Apr. 24, 2006, which published as 2006/0237688, whose disclosure is incorporated by reference herein in its entirety.

As used herein, "clathrate" refers to a crystal formed from the bonding of a molecule with water. More generally, a clathrate may be a lattice-type compound used to trap or hold another compound. A clathrate may be an organic addition compound comprising an internal space which is enclosed. A clathrate may be formed by the inclusion of molecules in cavities formed by crystal lattices or present in large molecules. Examples of clathrates include methanol clathrates, methane clathrates or hydrogen clathrates. The guest molecule may be held by the host molecule via physical, chemical or intermolecular forces. Host molecules may include urea, thiourea, hydroquinone, deoxycholic acid, triphenylcarbinol, perhydrotriphenylene, 18-crown-6 or 2,2,2-cryptand, for example. Examples of guest molecules include methanol, methane or hydrogen, for example.

As used herein, "polymer" refers to any of numerous natural and synthetic compounds of usually high molecular weight consisting of up to millions of repeated linked units, each a relatively light and simple molecule. Examples of polymers include polypropylene, Kynar Flex® (vinylidiene fluoride hexafluoropropylene copolymer), polyethylene, polyvinylidene fluoride (PVDF), hexafluoropropylene vinylidene fluoride copolymer, cross-linked copolymers, polytetrafluoroethylene (PTFE), perfluoro alkoxy (PFA) and thermoplastic polyesters (for example, Nylon™).

As used herein, "forming" refers to creating, manufacturing, giving shape or any method that produces the desired end product from starting materials.

As used herein, "contacting" refers to physically, chemically or electrically touching. A fluid may contact an enclosure, in which the fluid is physically forced inside the enclosure, for example.

As used herein "releasing" refers to freeing from something that binds, fastens or holds back, either physically or chemically. A fluid may be physically released from an enclosure, for example. A fluid may chemically be released from a metal hydride, for example.

As used herein, "occlude" or "occluding" or "occlusion" refers to absorbing or adsorbing and retaining a substance. Hydrogen may be the substance occluded, for example. A substance may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen may be bound physically or chemically, for example.

As used herein, "occluding/desorbing material" refers to a material capable of absorbing, adsorbing or retaining a substance and further capable of allowing the substance to be removed. The occluding/desorbing material may retain the substance chemically or physically, such as by chemisorption or physisorption, for example. Examples of such a material include metal hydrides, composite hydrogen storage materials, clathrates, etc.

Referring to FIG. 1, a cross-sectional view of a fluid enclosure 100 is shown, according to some embodiments. A structural filler 104 may be surrounded by an outer enclosure wall 102. The structural filler 104 may be conformably coupled to the outer enclosure wall 102, which may be represented by a bond 108. One or more optional features 106 may be utilized.

Structural Filler

The structural filler 104 may include a material with a sufficient tensile strength to withstand the internal pressure of the fluid enclosure 100, when pressurized with a fluid. Structural fillers may be solid. Structural fillers 104 may include metallic or plastic lattices, composite hydrogen storage materials, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

The structural filler 104 may include a material capable of occluding/desorbing a fluid, such as a metal hydride. This results in a material with sufficient tensile strength and fluid occluding/desorbing properties, such as composite hydrogen storage material, nano-structured carbon foams, aerogels or zeolites, for example. In addition, the fluid enclosure 100 may include a structural filler 104 and a separate, fluid occluding/desorbing material, such as a metal hydride powder or clathrate. For example, the structural filler 104 may be inert to the fluid being stored and the fluid enclosure may separately include a fluid occluding/desorbing material. If a lattice, the structural filler 104 may include small pores. Pores in the structural filler 104 may be used to hold fluid occluding/desorbing materials, such as metal hydrides or clathrates, for example. A methane clathrate may be used to store methane efficiently at high pressure and could be used in conjunction with a structural filler 104, such as a metal lattice.

The structural filler 104 may be conformably coupled to the outer enclosure wall 102, creating a bond 108. As the force due to internal pressure within the fluid enclosure 100 increases, the load may be transferred directly into a tensile load on the structural filler 104, rather than internal pressure being amplified into tensile load on the outer enclosure wall 102. The internal pressure of the fluid enclosure 100 may be affected by the amount of fluid stored. In addition, the amount of stress applied to the fluid enclosure 100 may be affected by the mechanical stress associated with contacting/releasing a fluid from a storage material, such as hydrogen occluding/desorbing from a metal hydride, for example.

The structural filler 104 may have a continuous, uniform thickness throughout the fluid enclosure 100. Alternatively, the structural filler 104 may include pockets or areas of discontinuous thickness or density, for example. One case may be where an irregularly shaped fluid enclosure 100 calls for more structural support, such as in a corner, the structural filler 104 may be more dense or include a greater portion of the available space within that area of the fluid enclosure 100.

Outer Enclosure Wall

The outer enclosure wall 102 may include a multitude of materials due to the low stress applied to the outer enclosure wall 102. The outer enclosure wall 102 may include a polymer or metal or multiple layers of each, for example. The outer enclosure wall 102 may be polypropylene, Kynar Flex® (vinylidiene fluoride hexafluoropropylene copolymer) (available through Arkema Inc, Philadelphia, Pa.), polyethylene, polyvinylidene fluoride (PVDF), hexafluoropropylene vinylidene fluoride copolymer, cross-linked copolymers, polytetrafluoroethylene (PTFE), perfluoro alkoxy (PFA), thermoplastic polyesters (for example, Nylon™), or combinations thereof, for example. The outer enclosure wall 102 may be formed of the same material as at least a portion of the structural filler 104, for example. The outer enclosure wall 102 may be a sheet or a solution, prior to application. The outer enclosure wall 102 does not have to be rigid or in any pre-formed shape. The outer enclosure wall 102 may act as a barrier to the exit of a fluid from the structural filler 104.

Because the structural filler 104 may be bonded to the outer enclosure wall 102, the stresses induced on the outer enclosure wall 102 become independent of the geometry chosen. In conventional enclosure designs, the geometry of the enclosure strongly dictates the relationship between the stress in the enclosure wall and the internal pressure. If a structural filler 104 is conformably coupled to the outer enclosure wall 102, virtually any geometry of the fluid enclosure 100 may be utilized, so long as the tensile strength of the structural filler 104 and the bond 108 between the structural filler 104 and outer enclosure wall 102 is larger than the internal pressure. The structural filler 104 may be formed into a desired shape before the outer enclosure wall 102 is conformably coupled to it.

The outer enclosure wall 102 may have a uniform or a varying wall thickness, for example. The outer enclosure wall 102 may have a greater wall thickness around a feature, for example. The outer enclosure wall 102 may have an average wall thickness of less than about 5000 microns, less than about 1500 microns, less than about 500 microns, less than about 300 microns, less than about 100 microns, less than about 50 microns, less than about 10 microns or less than about 1 micron, for example.

Figure 2:
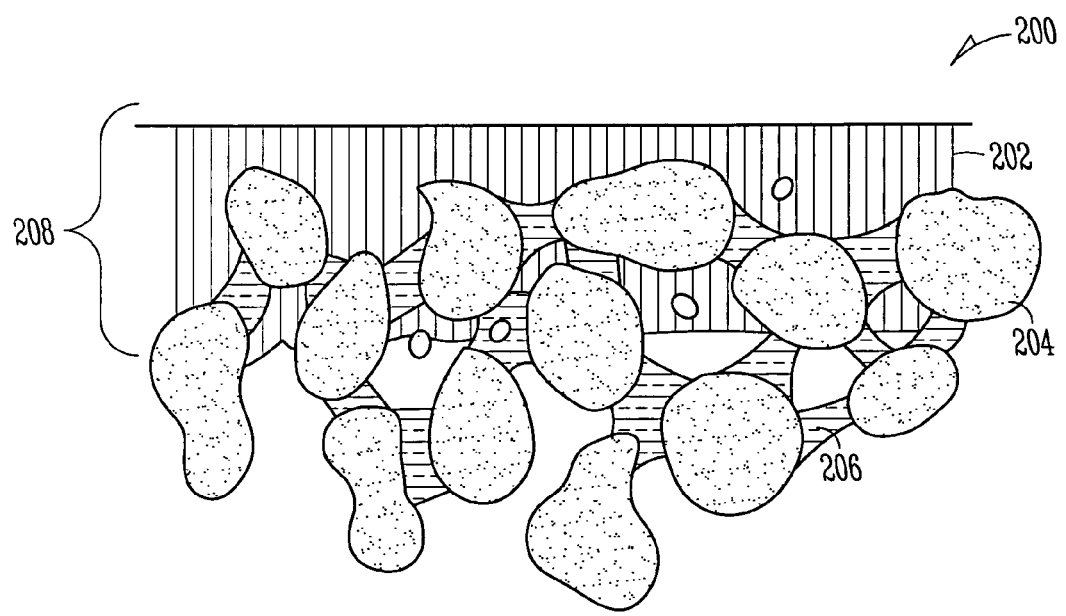
FIG. 2 illustrates a cross-sectional view of a portion of a fluid enclosure utilizing a composite hydrogen storage material, according to some embodiments.

Referring to FIG. 2, a cross-sectional view of a portion of a fluid enclosure 200 utilizing a composite hydrogen storage material is shown, according to some embodiments. Active particles 204 are immobilized by a binder 206, making up the composite hydrogen storage material, which is an example of a structural filler 104. The outer enclosure wall 202 penetrates within the interface region 208, conformably coupling to the structural filler.

Interface Region

The interface region 208 includes the bond 108 between the structural filler 104 and outer enclosure wall 202 and may vary in thickness. The outer enclosure wall 202 may be uniformly or near uniformly bonded to the structural filler 104 so that a homogeneous or near homogenous interface 208 may be formed, which prevents localized stress concentrations building up at the outer enclosure wall 202. The outer enclosure wall 202 material may be applied to the structural filler 104 and allowed to penetrate the surface, creating a bond 108 in the interface region 208. The interface region 208 may become stronger than the structural filler 104, so that a failure of the fluid enclosure 300 may be a failure from the structural filler 104 and not from the bond 108 found at the interface 208. The interface region 208 may be less than about 50 microns, about 50-100 microns, about 100-150 microns, about 150-200 microns or more than 200 microns thick, for example.

Figure 3:
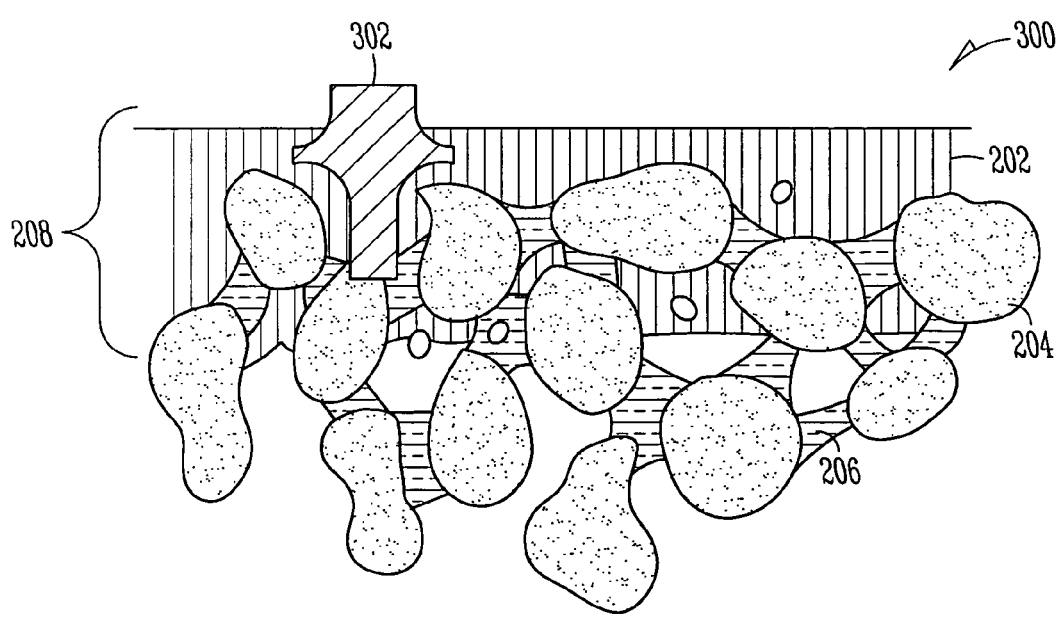
FIG. 3 illustrates a cross-sectional view of a portion of a fluid enclosure utilizing a composite hydrogen storage material including a feature, according to some embodiments.

Referring to FIG. 3, a cross-sectional view of a portion of a fluid enclosure 300 utilizing a composite hydrogen storage material including a feature is shown, according to some embodiments. Active particles 204 are immobilized by a binder 206, making up the composite hydrogen storage material, which is an example of a structural filler 104. The outer enclosure wall 202 penetrates within the interface region 208, conformably coupling to the structural filler. One or more features 302 are positioned within the outer enclosure wall 202.

Features

The one or more features 302 may be adapted to control the movement of a fluid into or out of the fluid enclosure 300, may observe or control the fluid or may be used as a structural component, for example. The one or more features 302 may be used to communicate between the fluid enclosure 300 and an external device, such as a fuel cell. Examples of a feature 302 may be a valve, vent, cap, fitting, regulator, pressure relief device, flow element (i.e., flow restrictor), etc. Examples of the one or more features 302 may include fluidic components sold by Swagelok Co. or Beswick Engineering Co., for example. In the case where the feature may be a pressure relief device, it may be a pressure-activated PRD or a thermally-activated PRD. Further, it may be a self-destructive type PRD, such as fusible trigger, rupture disk or diaphragm, or a re-sealable type, such as spring-loaded pressure relief valve (PRV). Alternately, the outer enclosure wall may be engineered to have a pressure relief feature engineered in/integrated into the wall itself.

The one or more features 302 may be structural features associated with the shape, positioning or alignment of the structural filler, the outer enclosure wall or the overall fluid enclosure. A structural feature may be formed to allow space for external components or to create more efficient alignment between the fluid enclosure and an external device, for example. Structural features may include convex protrusions, concave recesses, mountings, flanges, fittings, bosses, smoothed or radiused corners, threaded standoffs, latching or locking features, etc.

The one or more features 302 may include safety enhancing aspects. For example, the feature may include a small, recessed valve that may only be activated with the proper tool. Further, an example may be features of such size as to make them inaccessible to inadvertent activation, such as small features within a recessed area. The one or more features 302 may also include connecting hardware, in which the fluid enclosure 300 may be coupled to an external device, such that during connecting/disconnecting of the fluid enclosure 300, little to no leakage occurs. Exemplary connecting hardware may be found, for example, in Adams, et al., U.S. Patent Application No. 2005/0022883, entitled "FUEL CARTRIDGE WITH CONNECTING VALVE," the disclosure of which is incorporated herein by reference in its entirety.

Figure 4:
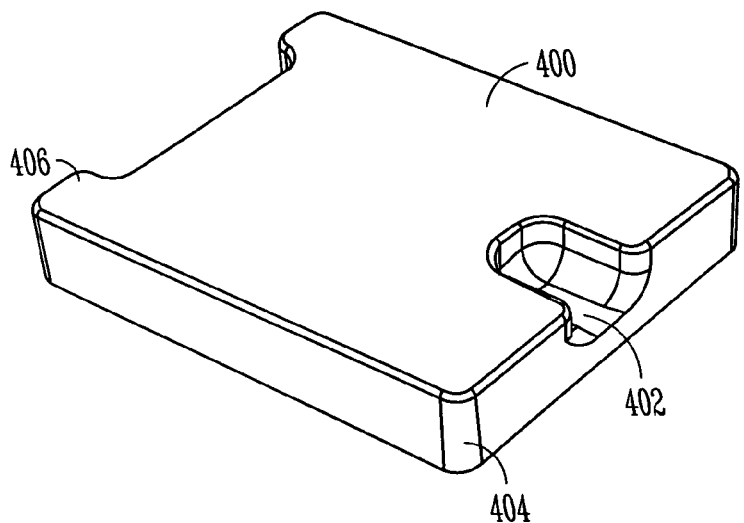
FIG. 4 illustrates a perspective view of a fluid enclosure, according to some embodiments.

Referring to FIG. 4, a perspective view of a fluid enclosure 400 is shown, according to some embodiments. The fluid enclosure 400 displayed includes a largely prismatic form factor including a concave feature 402 and convex feature 406, such as a protrusion. The concave feature 402 may be utilized to accommodate an external valve or pressure regulator, for example. The convex feature 406 and rounded corners 404 may be utilized such that the fluid enclosure 400 may fit an available space, such as that provided by an external device, for example. The convex feature 406 may also be used to lock, latch or securely hold the fluid enclosure 400 to or within an external device. Some structural features, like the convex feature 406, allow for the dual function of fluid storage and efficient alignment/positioning of the fluid enclosure 400.

Fluid Enclosure Shape

The fluid enclosure 400 may have a regular or irregular shape. Regular shapes may include cylindrical, prismatic, or polyhedral shapes (i.e., tetrahedral shapes), for example. Irregular shapes may be chosen to conform to fitting within a confined volume or space available, such as to fit within the interior volume of an enclosure of an electronic device. Irregular shapes may also be chosen so as to accommodate features, such as external fittings or fluid control devices. Other form factors, such as irregularly shaped polyhedrons, for example, are also possible.

Fluid Enclosure System

Figure 5:
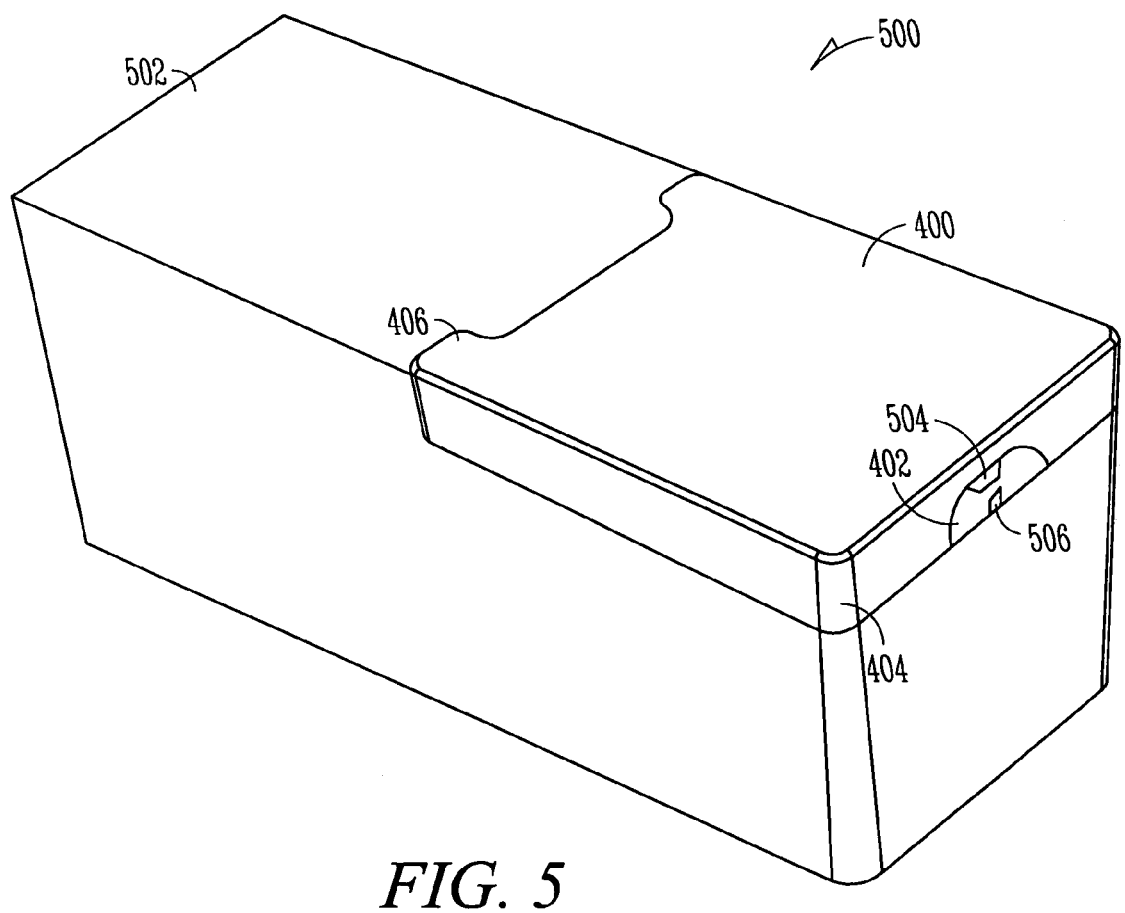
FIG. 5 illustrates a perspective view of a fluid enclosure system, according to some embodiments.

Referring to FIG. 5, a perspective view of a fluid enclosure system 500 is shown, according to some embodiments. The fluid enclosure system 500 includes a fluid enclosure 400 coupled to an external device 502. The convex feature 406 and rounded corners 404 of the fluid enclosure 400 may be utilized such that the fluid enclosure 400 may fit the available space provided by the external device 502. Examples of an external device 502 may be a fuel cell, heat pump, battery, compressor or air conditioning unit, for example. Further, the external device may additionally be coupled to an electronic device, such as a portable electronic device, or to the electronics of an electronic device. Examples of portable electronic devices include cellular phones, satellite phones, PDAs (personal digital assistants), laptop computers, computer accessories, displays, personal audio or video players, medical devices, televisions, transmitters, receivers, lighting devices including outdoor lighting or flashlights, and electronic toys.

The concave feature 402 may house such features 504, 506 as connectors, valves or regulators, for example. The concave feature 402 may also provide a space for electronic/power conditioning associated with a fuel cell power pack.

Figure 6:
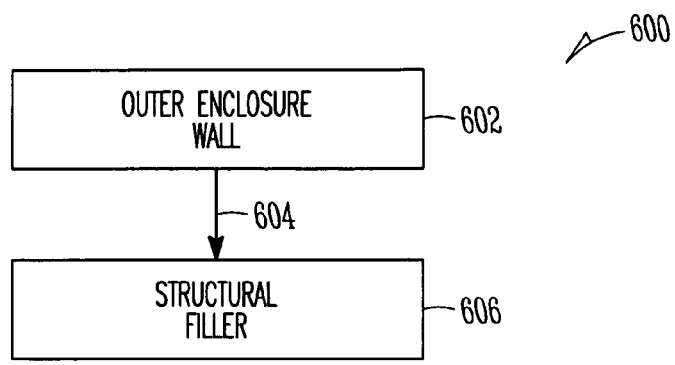
FIG. 6 illustrates a block flow diagram of a method of manufacturing a fluid enclosure, according to some embodiments.

Referring to FIG. 6, a block flow diagram of a method of manufacturing 600 a fluid enclosure is shown, according to some embodiments. An outer enclosure wall 602 may be conformably coupled 604 to a structural filler 606.

Conformably Coupling

The outer enclosure wall 602 may be conformally coupled 604 to the structural filler 606 by a variety of methods. Such methods include spraying, painting, dip coating, inset molding, electrostatic deposition, compression molding, transfer molding, injection molding, thermoset injection molding, extrusion, pultrusion, thermoforming, etc. The wall thickness may be increased by duplicating the coupling process or using a different coupling process in order to create multiple layers. Not only can multiple layers of the outer enclosure wall 602 be applied, but one or more layers of other materials may be added. For example, if a thin outer enclosure wall is formed, fluid may slowly diffuse through the wall. A sealing layer may be applied to prevent such diffusion. Examples of a sealing layer may be a thin metallic layer, such as aluminum, copper, gold or platinum. The outer enclosure wall 602 may be comprised of the same or similar material as the structural filler 606, or a portion of the structural filler 606, in order to increase the bond strength, for example. The layers may be heated or sintered after application.

One or more features, including but not limited to structural features, may be formed in the structural filler 606, formed with the outer enclosure wall 602 or formed during the coupling of the structural filler and outer enclosure wall. Examples of such features include fittings, regulators, fasteners, mounting flanges, bosses, valves, vents, caps, flow elements, etc.

Fluid Enclosure Size/Volume

Embodiments of the invention allow for a fluid enclosure or fluid enclosure system to be manufactured at sizes not previously contemplated. Although readily usable at large sizes, the fluid enclosure may be as thin as less than about 10 mm, for example. The fluid enclosure may have a volume of less than about 1000 cm³, less than about 500 cm³, less than about 120 cm³, less than about 10 cm³, less than about 5 cm³, less than about 2 cm³ or less than about 1 cm³, for example. A fluid enclosure system, including an external device, may be less than about 1000 cm³, less than about 500 cm³, less than about 120 cm³, less than about 25 cm³, less than about 15 cm³, less than about 10 cm³ or less than about 5 cm³ for the total system, for example.

Storing Fluid

Figure 7:
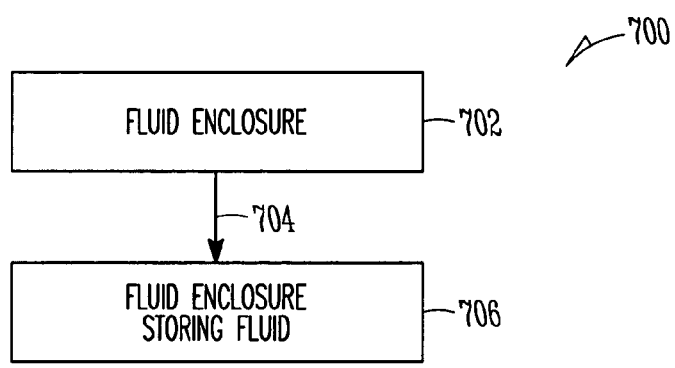
FIG. 7 illustrates a block flow diagram of a method of storing a fluid, according to some embodiments.

Referring to FIG. 7, a block flow diagram of a method of storing 700 a fluid is shown, according to some embodiments. A fluid enclosure 702 of the embodiments of the present invention may be contacted 704 with a fluid, sufficient to provide a fluid enclosure storing fluid 706. The fluid may then be stored for a desired amount of time. After contacting 704 the fluid enclosure 702, the fluid may be released. After releasing the fluid, the fluid enclosure 702 may be contacted again with fluid. The fluid enclosure 702 may be contacted with a fluid and released of fluid multiple times. The fluid enclosure may be contacted with a fluid and the fluid released once, at least about 3 times, at least about 50 times, at least about 300 times, at least about 500 times, at least about 1000 times or at least about 10,000 times, for example.

Using Fluid Enclosure

Figure 8:
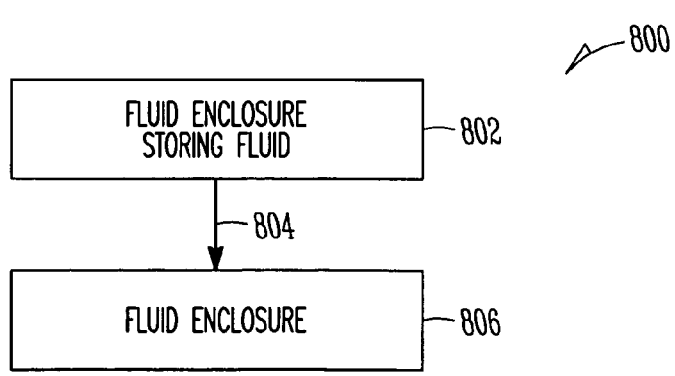
FIG. 8 illustrates a block flow diagram of a method of using a fluid enclosure, according to some embodiments.

Referring to FIG. 8, a block flow diagram of a method of using 800 a fluid enclosure is shown, according to some embodiments. A fluid enclosure storing a fluid 802 may release 804 a fluid. Releasing 804 all or a portion of the fluid from the fluid enclosure storing a fluid 802 provides a fluid enclosure 806 which may contain less fluid. The fluid enclosure storing a fluid 802 may be coupled to an external device, such that the fluid is released 804 to the external device for its use or to power the device, for example. Examples of an external device may be a fuel cell, heat pump or electrolyser. The fluid enclosure may also accept fluid from an external device coupled to it, such as an electrolyser, or waste fluid from some types of fuel cells (i.e. spent electrolyte from a direct borohydride fuel cell, $CO_2$ produced from any hydrocarbon fuel based fuel cell, such as a formic acid fuel cell, direct methanol fuel cell, reformed methanol fuel cell, etc.).

After releasing 804 the fluid, the fluid enclosure 806 may be contacted with a fluid. The fluid may then be released again. The releasing and contacting of fluid to the fluid enclosure 806 may be repeated multiple times. The releasing and contacting of fluid to the fluid enclosure may occur once, at least about 3 times, at least about 50 times, at least about 300 times, at least about 500 times, at least about 1000 times or at least about 10,000 times, for example.

Embodiments of the present invention describe a fluid enclosure that may be used in a portable galvanic or electrochemical cell, such as a fuel cell system, as a fuel reservoir. Other embodiments describe a fluid enclosure that may be used as a storage reservoir for use in a device, such as in heat pumps, hydrogen compressors or air conditioners, for example. Some examples of portable electronics for use with the fuel cell include, but are not limited to, cellular phones, satellite phones, PDAs, laptop computers, computer accessories, displays, personal audio or video players, medical devices, televisions, transmitters, receivers, lighting devices including outdoor lighting or flashlights, electronic toys, or any device conventionally used with batteries.

The present invention will now be described with the following non-limiting examples.

EXAMPLES

Example 1

Wafers of a structural filler made from a composite hydrogen storage material were formed by heat and pressure sintering as detailed in U.S. patent application Ser. No. 11/379,970, which published as 2006/0237688, with densities between about 5 g/cc and about 6.1 g/cc. The wafers with densities from about 5 to about 5.5 g/cc included about 6% by weight of Kynar Flex® 2851as a binder. Wafers with densities of about 5.5 to about 6.1 g/cc included about 4% by weight of Kynar Flex® 2851as a binder. The wafers were substantially free of dust and were substantially free of dust and were substantially free of surface roughness features exceeding about 50microns (μm, or $10^{-6}$ m).

Components were attached using a Kynar Flex® interface. A solvent solution of about 40 to about 80 g/L Kynar Flex® 2751 was used as a glue for connecting the components to the enclosure. A fluid port or opening was fitted with a 2-micron filter and a small hole (about 0.8 micron) was drilled into the wafer (about 7 microns) to facilitate fluid diffusion into and out of the enclosure.

Kynar Flex® 2851 dissolved in acetone was applied as a coating in multiple layers. The first layer was applied by dipping a wafer into a solution of about 40 g/L Kynar Flex® 2851 dissolved in acetone. The solution then penetrated the surface pores of the wafer. Subsequent layers were painted on using about 80 g/L Kynar Flex® 2851 in acetone and were allowed to fully dry between applications. A total of about 20 to about 30 mg/cm² of coating was disposed uniformly on the wafer. After drying, the remaining coating (outer enclosure wall) was about 100 to about 150 microns thick. The fluid enclosure was then sintered at about 190° C. for about 20 minutes.

Example 2

A prismatic format block of a composite hydrogen storage material was formed with dimensions of about 5 cm×3 cm×0.5 cm, corners were radiused and smoothed. Two sheets of polypropylene were formed with approximate dimensions of the prismatic block and placed on either side of the prismatic format block. The three layer structure was then isostatically pressed at about 150 psi (1.03 MPa or about 1 MPa) and heated to about 180° C. for about 30 minutes. Once cooled, the polypropylene sheets had been conformably bonded to the structural filler. An opening was cut in to the conformably formed enclosure wall, and a gas fitting inserted and held in place with adhesive material.

Example 3

A similar prismatic format block of composite hydrogen storage material, as in Example 2, was formed. RTV Silicone (Dow Corning) was applied as a coating of a thermoset elastomeric polymer. The coating was applied and cured at about 120° C.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

All publications, patents, and patent documents referenced herein are incorporated by reference herein in their entirety, as though individually incorporated by reference.

What is claimed is:

1. A fluid enclosure, comprising:
a structural filler, including;
a material capable of occluding and desorbing a fluid;
a binder; and
an outer enclosure wall, conformably coupled to the structural filler;
wherein the structural filler supports stress applied by an internal fluid pressure.

2. The fluid enclosure of claim 1, wherein the material capable of occluding and desorbing a fluid comprises a metallic or plastic lattice, composite hydrogen storage material, nano-structured carbon foam, aerogel, zeolite, silica, alumina, graphite, activated carbon, micro-ceramic, nano-ceramic, boron nitride nanotube, borohydride powder, palladium-containing material or combinations thereof.

3. The fluid enclosure of claim 1, wherein the structural filler comprises a composite hydrogen storage material.

4. The fluid enclosure of claim 3, wherein the composite hydrogen storage material comprises a metal hydride.

5. The fluid enclosure of claim 1, wherein the structural filler comprises a lattice including pores.

6. The fluid enclosure of claim 5, wherein the pores support the material capable of occluding and desorbing a fluid.

7. The fluid enclosure of claim 1, further comprising a metal hydride.

8. The fluid enclosure of claim 1, wherein the material capable of occluding and desorbing a fluid comprises a metal hydride.

9. The fluid enclosure of claim 1, wherein the material capable of occluding and desorbing a fluid comprises a clathrate.

10. The fluid enclosure of claim 1, wherein the material capable of occluding and desorbing a fluid comprises a methane clathrate.

11. The fluid enclosure of claim 1, wherein the structural filler comprises a continuous, uniform thickness throughout the fluid enclosure.

12. The fluid enclosure of claim 1, wherein the structural filler comprises a non-uniform thickness throughout the fluid enclosure.

13. The fluid enclosure of claim 1, wherein the outer enclosure wall comprises a polymer.

14. The fluid enclosure of claim 1, wherein the outer enclosure wall comprises polypropylene, vinylidiene fluoride hexafluoropropylene copolymer, polyethylene, polyvinylidene fluoride (PVDF), hexafluoropropylene vinylidene fluoride copolymer, cross-linked copolymers, polytetrafluoroethylene (PTFE), perfluoro alkoxy (PFA), thermoplastic polyesters, or combinations thereof.

15. The fluid enclosure of claim 1, wherein the outer enclosure wall comprises vinylidiene fluoride hexafluoropropylene copolymer.

16. The fluid enclosure of claim 1, wherein the outer enclosure wall comprises the same material as at least a portion of the structural filler.

17. The fluid enclosure of claim 1, wherein the outer enclosure wall comprises multiple layers.

18. The fluid enclosure of claim 17, wherein the multiple layers are comprised of the same material.

19. The fluid enclosure of claim 1, wherein the outer enclosure wall has an average thickness of less than about 5000 microns.

20. The fluid enclosure of claim 1, wherein the outer enclosure wall has an average thickness of less than about 1500 microns.

21. The fluid enclosure of claim 1, wherein the outer enclosure wall has an average thickness of less than about 500 microns.

22. The fluid enclosure of claim 1, wherein the outer enclosure wall has an average thickness of less than about 300 microns.

23. The fluid enclosure of claim 1, wherein the outer enclosure wall has an average thickness of less than about 100 microns.

24. The fluid enclosure of claim 1, wherein the outer enclosure wall has an average thickness of less than about 10 microns.

25. The fluid enclosure of claim 1, wherein the outer enclosure wall has an average thickness of less than about 1 micron.

26. The fluid enclosure of claim 1, further comprising one or more features, positioned within the outer enclosure wall.

27. The fluid enclosure of claim 26, wherein the one or more features are selected from the group of a valve, a regulator, a vent, a cap, a pressure relief device, a flow element and combinations thereof.

28. The fluid enclosure of claim 1, further comprising one or more structural features.

29. The fluid enclosure of claim 28, wherein the one or more structural features are selected from the group of a boss, a mounting flange, a fastener, a fitting, a concave recess, a radiused corner, a convex protrusion and combinations thereof.

30. The fluid enclosure of claim 29, wherein the one or more structural features comprises a concave recess.

31. The fluid enclosure of 29, wherein the one or more structural features comprises a convex protrusion.

32. The fluid enclosure of claim 1, further comprising a fluid, in contact with the structural filler.

33. The fluid enclosure of claim 32, wherein the fluid comprises a gas, a liquefied gas, a liquid or a combination thereof.

34. The fluid enclosure of claim 32, wherein the fluid comprises a gas.

35. The fluid enclosure of claim 1, wherein the fluid enclosure comprises a cylindrical shape, a prismatic shape or a polyhedral shape.

36. The fluid enclosure of claim 1, wherein the fluid enclosure comprises a tetrahedral shape.

37. The fluid enclosure of claim 1, wherein the fluid enclosure comprises an irregular shape, adapted to substantially fit an allotted space.

38. The fluid enclosure of claim 1, further comprising one or more sealing layers, conformably coupled to the outer enclosure wall.

39. The fluid enclosure of claim 1, further comprising one or more sealing layers, conformably coupled to the structural filler.

40. The fluid enclosure of claim 38, wherein the one or more sealing layers comprise a metallic layer.

41. The fluid enclosure of claim 40, wherein the one or more sealing layers comprise an aluminum layer.

42. The fluid enclosure of claim 1, wherein the fluid enclosure comprises a volume of less than about 1000 cubic centimeters.

43. The fluid enclosure of claim 1, wherein the fluid enclosure comprises a volume of less than about 10 cubic centimeters.

44. The fluid enclosure of claim 1, wherein the fluid enclosure comprises a volume of less than about 5 cubic centimeters.

45. The fluid enclosure of claim 1, wherein the fluid enclosure comprises a volume of less than about 2 cubic centimeters.

46. The fluid enclosure of claim 1, wherein the fluid enclosure comprises a volume of less than about 1 cubic centimeter.

47. A method of manufacturing a fluid enclosure, the method comprising:
conformably coupling an outer enclosure wall to a structural filler, sufficient to provide a fluid enclosure, the fluid enclosure comprising:
a structural filler, including:
a material capable of occluding and desorbing a fluid;
a binder; and
an outer enclosure wall, conformably coupled to the structural filler;
wherein the structural filler supports stress applied by an internal fluid pressure.

48. The method of claim 47, further comprising before conformably coupling, coupling one or more features to the structural filler or the outer enclosure wall.

49. The method of claim 47, further comprising after conformably coupling, coupling one or more features to the structural filler, the outer enclosure wall or both.

50. The method of claim 47, wherein conformably coupling the outer enclosure wall to the structural filler includes spraying, painting, dip coating, inset molding, electrostatic deposition, compression molding, transfer molding, injection molding, thermoset injection molding, extrusion, pultrusion, thermoforming or combinations thereof.

51. The method of claim 47, wherein conformably coupling the outer enclosure wall to the structural filler includes dip coating.

52. The method of claim 47, further comprising after conformably coupling, forming one or more sealing layers.

53. The method of claim 48, wherein forming one or more features includes forming one or more features into the structural filler, the outer enclosure wall or a combination thereof.

54. A method of storing a fluid, the method comprising:
contacting a fluid enclosure with a fluid, sufficient to provide a fluid enclosure storing a fluid,
wherein the fluid enclosure comprises:
a structural filler, including;
a material capable of occluding and desorbing a fluid;
a binder; and
an outer enclosure wall, conformably coupled to the structural filler;
wherein the structural filler supports stress applied by an internal fluid pressure.

55. The method of claim 54, further comprising after contacting, releasing the fluid from the fluid enclosure.

56. The method of claim 55, further comprising after releasing the fluid, contacting and releasing the fluid multiple times.

57. The method of claim 55, further comprising after releasing the fluid, contacting and releasing the fluid at least about 3 times.

58. The method of claim 55, further comprising after the fluid, contacting and releasing the fluid at least about 50 times.

59. The method of claim 55, further comprising after releasing the fluid, contacting and releasing the fluid at least about 300 times.

60. The method of claim 55, further comprising after releasing the fluid, contacting and releasing the fluid at least 500 times.

61. The method of claim 55, further comprising after releasing the fluid, contacting and releasing the fluid at least about 1000 times.

62. The method of claim 55, further comprising after releasing the fluid, contacting and releasing the fluid at least about 10,000 times.

63. A method of using a fluid enclosure, the method comprising:
releasing a fluid from a fluid enclosure, the fluid enclosure comprises:
a structural filler, including;
a material capable of occluding and desorbing a fluid;
a binder; and
an outer enclosure wall, conformably coupled to the structural filler;
wherein the structural filler supports stress applied by an internal fluid pressure.

64. The method of claim 63, further comprising after releasing, contacting the fluid enclosure with a fluid.

65. The method of claim 64, further comprising after contacting the fluid enclosure, releasing and contacting the fluid enclosure multiple times.

66. The method of claim 64, further comprising after contacting the fluid enclosure, releasing and contacting the fluid enclosure at least about 3 times.

67. The method of claim 64, further comprising after contacting the fluid enclosure, releasing and contacting the fluid enclosure at least about 50 times.

68. The method of claim 64, further comprising after contacting the fluid enclosure, releasing and contacting the fluid enclosure at least about 300 times.

69. The method of claim 64, further comprising after contacting the fluid enclosure, releasing and contacting the fluid enclosure at least about 500 times.

70. The method of claim 64, further comprising after contacting the fluid enclosure, releasing and contacting the fluid enclosure at least about 1000 times.

71. The method of claim 64, further comprising after contacting the fluid enclosure, releasing and contacting the fluid enclosure at least about 10,000 times.

72. A fluid enclosure system, the system comprising:
a fluid enclosure; and
an external device, coupled to the fluid enclosure; the fluid enclosure comprises:
a structural filler, including;
a material capable of occluding and desorbing a fluid;
a binder; and
an outer enclosure wall, conformably coupled to the structural filler;
wherein the structural filler supports stress applied by an internal fluid pressure.

73. The fluid enclosure system of claim 72, wherein the external device comprises a fuel cell, a heat pump, a hydrogen compressor or an air conditioner.

74. The fluid enclosure system of claim 72, wherein the external device comprises a fuel cell.

75. The fluid enclosure system of claim 74, wherein the fuel cell is further coupled to an electronic device.

76. The fluid enclosure system of claim 75, wherein the electronic device comprises a cellular phone, satellite phone, PDA, laptop computer, computer accessory, display, personal audio or video player, medical device, television, transmitter, receiver, lighting device, flashlight or electronic toy.

77. The fluid enclosure system of claim 72, wherein the fluid enclosure system comprises a volume of less than about 1000 cubic centimeters.

78. The fluid enclosure system of claim 72, wherein the fluid enclosure system comprises a volume of less than about 120 cubic centimeters.

79. The fluid enclosure system of claim 72, wherein the fluid enclosure system comprises a volume of less than about 25 cubic centimeters.

80. The fluid enclosure system of claim 72, wherein the fluid enclosure system comprises a volume of less than about 15 cubic centimeters.

81. The fluid enclosure system of claim 72, wherein the fluid enclosure system comprises a volume of less than about 10 cubic centimeters.

82. The fluid enclosure system of claim 72, wherein the fluid enclosure system comprises a volume of less than about 5 cubic centimeters.

* * * * *

UNITED STATES PATENT AND TRADEMARK OFFICE
CERTIFICATE OF CORRECTION

| | |
|---|---|
| PATENT NO. | : 7,563,305 B2 |
| APPLICATION NO. | : 11/473591 |
| DATED | : July 21, 2009 |
| INVENTOR(S) | : Joerg Zimmermann |

It is certified that error appears in the above-identified patent and that said Letters Patent is hereby corrected as shown below:

In column 4, line 34, delete "vinylidiene" and insert -- vinylidene --, therefor.

In column 5, line 65, delete "vinylidiene" and insert -- vinylidene --, therefor.

In column 10, line 17, after "dust" delete "and were substantially free of dust".

In column 10, line 19, delete "50microns" and insert -- 50 microns --, therefor.

In column 11, line 49, in Claim 14, delete "vinylidiene" and insert -- vinylidene --, therefor.

In column 11, line 56, in Claim 15, delete "vinylidiene" and insert -- vinylidene --, therefor.

In column 13, line 14, in Claim 47, delete "including:" and insert -- including; --, therefor.

Signed and Sealed this

Sixth Day of October, 2009

David J. Kappos
*Director of the United States Patent and Trademark Office*